United States Patent
Slatman et al.

(10) Patent No.: US 10,449,496 B2
(45) Date of Patent: Oct. 22, 2019

(54) PRESSURE DEW POINT-CONTROLLED PURGE AIR REGULATING UNIT

(71) Applicant: BEKO Technologies GmbH, Neuss (DE)

(72) Inventors: Johannes Franciscus Slatman, Helmond (NL); Thomas Prior, Odenthal (DE); Johannes Sinstedten, Korschenbroich (DE); Herbert Schlensker, Leverkusen (DE)

(73) Assignee: BEKO TECHNOLOGIES GMBH (DE)

(*) Notice: Subject to any disclaimer, the term of this patent is extended or adjusted under 35 U.S.C. 154(b) by 129 days.

(21) Appl. No.: 15/558,687

(22) PCT Filed: Mar. 16, 2016

(86) PCT No.: PCT/EP2016/055631
§ 371 (c)(1),
(2) Date: Sep. 15, 2017

(87) PCT Pub. No.: WO2016/146653
PCT Pub. Date: Sep. 22, 2016

(65) Prior Publication Data
US 2018/0111095 A1 Apr. 26, 2018

(30) Foreign Application Priority Data
Mar. 19, 2015 (DE) .................. 10 2015 104 154

(51) Int. Cl.
*B01D 53/22* (2006.01)
*B01D 65/02* (2006.01)
(Continued)

(52) U.S. Cl.
CPC ............. *B01D 65/02* (2013.01); *B01D 53/22* (2013.01); *B01D 53/268* (2013.01); *B01D 53/30* (2013.01);
(Continued)

(58) Field of Classification Search
CPC .... B01D 53/30; B01D 2321/18; B01D 69/08; B01D 2321/185; B01D 53/268;
(Continued)

(56) References Cited

U.S. PATENT DOCUMENTS 2,691,123 A * 10/1954 Hugo ..................... G01N 25/64
   318/632
4,512,851 A * 4/1985 Swearingen ......... B01D 1/0082
   159/2.1
(Continued)

FOREIGN PATENT DOCUMENTS

DE      19839057 A1    3/2000
DE   102010005480 B3    6/2011
(Continued)

OTHER PUBLICATIONS

Vaisala "Dew-point-compressed-air-Application-note-B210991EN-B-LOW-v1" 2013 https://www.vaisala.com/sites/default/files/documents/Dew-point-compressed-air-Application-note-B210991EN-B-LOW-v1.pdf (Year: 2013).*
(Continued)

*Primary Examiner* — Anthony R Shumate
(74) *Attorney, Agent, or Firm* — McCarter & English, LLP

(57) ABSTRACT

A purge air regulating unit for a drying device for compressed air, the purge air regulating unit being connectable to a housing in which a membrane filter, such as a bundle of hollow fiber membranes, is arranged such that a sub-flow of dried compressed air flowing out of the housing from an (Continued)

outlet channel can be conducted back to the hollow fiber membranes as purge air by the purge air regulating unit. A method for regulating the flow of dried compressed air flowing out of a membrane dryer back into a housing of the membrane dryer, the membrane dryer being equipped with a membrane filter, such as a bundle of hollow fiber membranes, is also provided.

16 Claims, 2 Drawing Sheets

(51) Int. Cl.
*B01D 53/26* (2006.01)
*B01D 53/30* (2006.01)
*B01D 63/02* (2006.01)
*B01D 61/02* (2006.01)
*B01D 65/00* (2006.01)
*B01D 69/08* (2006.01)

(52) U.S. Cl.
CPC .......... *B01D 61/025* (2013.01); *B01D 63/02* (2013.01); *B01D 65/00* (2013.01); *B01D 69/08* (2013.01); *B01D 2053/224* (2013.01); *B01D 2313/26* (2013.01); *B01D 2321/18* (2013.01); *B01D 2321/185* (2013.01)

(58) Field of Classification Search
CPC ................ B01D 65/02; B01D 2313/26; B01D 2053/224; B01D 53/22; B01D 63/02; B01D 65/00; B01D 61/025
See application file for complete search history.

(56) References Cited

U.S. PATENT DOCUMENTS

| | | |
|---|---|---|
| 5,160,514 A | 11/1992 | Newbold et al. |
| 2004/0194483 A1 | 10/2004 | Hoyt et al. |
| 2006/0021454 A1* | 2/2006 | Rasmussen ............. G01N 5/02 73/865 |
| 2012/0286060 A1* | 11/2012 | Korobochkin ............ F25C 3/04 239/14.2 |
| 2013/0036794 A1* | 2/2013 | Xia ........................ G01N 25/66 73/25.04 |
| 2013/0333356 A1* | 12/2013 | Kuroki .................... F02B 47/10 60/278 |
| 2016/0097554 A1* | 4/2016 | Lyons ...................... G01P 5/06 73/861.85 |
| 2017/0101991 A1* | 4/2017 | Yenneti ................... F04C 29/04 |
| 2018/0017062 A1* | 1/2018 | Peters ..................... F04C 18/16 |
| 2018/0119600 A1* | 5/2018 | Lu ............................ F01M 3/02 |
| 2018/0119602 A1* | 5/2018 | Lu ........................... F02M 26/47 |

FOREIGN PATENT DOCUMENTS

| | | |
|---|---|---|
| EP | 0903173 A2 | 3/1993 |
| JP | 2001232137 A | 8/2001 |
| JP | 2008284409 A | 11/2008 |
| JP | 2015048916 A | 3/2015 |
| WO | 2009026005 A1 | 2/2009 |

OTHER PUBLICATIONS

International Search Report for Application No. PCT/EP2016/055631, dated May 23, 2016, 2 pages.

\* cited by examiner

PRESSURE DEW POINT-CONTROLLED PURGE AIR REGULATING UNIT

CROSS-REFERENCE TO RELATED APPLICATION(S)

This application is a U.S. national stage application of international application no. PCT/EP2016/055631 filed Mar. 16, 2016 entitled "Pressure Dew Point-controlled Purge Air Regulating Unit," which claims priority to German application no. DE 2015/10104154 filed Mar. 19, 2015, which are hereby expressly incorporated by reference as part of the present disclosure.

FIELD OF THE INVENTION

The invention relates to a purge air regulating unit for a drying device for compressed gas, such as compressed air, the purge air regulating unit being connectable to a housing in which a membrane filter, such as a bundle of hollow fibre membranes, is arranged.

BACKGROUND

When compressed air is used, for example in industrial or medical technology, moisture in the pipe network and at the consumption points is a quality problem. Drying the compressed air is therefore always an important task.

SUMMARY

To this end, membrane filters that are selectively permeable to water vapour are used. A bundle of highly selective hollow fibre membranes (membrane fibres), through which the moist compressed air flows, is arranged in the filter housing. The moist compressed air is preferably filtered so that any dirt particles, oil mist and condensate still in it are retained and therefore do not clog the hollow fibre membrane. Water vapour diffuses outwards through the hollow fibre membrane. At the outlet for dried compressed air, a small sub-flow of the compressed air is branched off and used as purge air after expansion. The purge air is conducted in counterflow to the compressed air over the outside of the hollow fibres. Owing to the difference in the water vapour concentration, a constant migration of the water molecules out of the compressed air into the purge air is achieved. Therefore, the usually customary term membrane filter is at least ambiguous, since a membrane filter separates by diffusion, not mechanically. For the sake of simplicity, this term is still used within the context of the invention.

This process takes place continuously. The purge air dries the incoming moist compressed air constantly. Only water molecules can penetrate the membranes of the hollow fibres. The composition of the dried compressed air remains unchanged. As a result, clean, dry compressed air is obtained.

The volume of the purge air stream is defined by a nozzle, which allows through a constant volumetric flow that is defined by the pressure and the nozzle size. It is disadvantageous that during partial or no loading, that is, when little or no compressed air is required, the purge air stream remains constant although only some or none of it is needed. This results in considerable pressure losses in the overall system.

To reduce this problem, purge air regulators are known, the task of which consists in adapting the purge air stream to the required quantity.

U.S. Pat. No. 5,160,514 discloses a drying device for compressed air having such a purge air regulator, which is integrated in a drying device for compressed air. To this end, the compressed air output of the drying device is connected to a chamber that is delimited by a membrane. On the other side of the membrane there is a further chamber, which is connected to the compressed air input of the drying device via a line. The membrane assumes a position depending on the pressure difference between compressed air input and compressed air output. The membrane is connected to a valve element, which has a lateral slot and is guided in an associated internal bore in the housing. Depending on the position of the membrane, the valve element assumes a position that allows a greater or lesser stream of compressed air of the compressed air output towards the input of the purge line.

This purge air regulator does not operate satisfactorily. The regulation behaviour is insufficient, especially when there are small pressure differences between the input pressure and the output pressure for compressed air of the drying device. Another disadvantage of this solution is that the regulation has to be adjusted to a specific (average) operating pressure. If there are deviations in the operating pressure, the regulation behaviour changes considerably. This results in ambiguous ratios.

In addition, the pressure difference is also dependent on the loading of the filter element; the fill level has an effect on the pressure difference and therefore also on the regulation of the purge air. This can change during service life of the filter element, which is undesirable.

Proceeding therefrom, the object of the invention is to create a purge air regulating unit for a drying device for compressed air that allows better regulation or switching of the purge air. The most sensitive and rapid reaction possible should be possible. However, the purge air regulation unit should still be relatively simple in structure and inexpensive to produce. A further object of the invention consists in the provision of a corresponding method for regulating the flow of dried compressed air flowing out of a membrane dryer into a housing of the membrane dryer.

According to the invention, the object is achieved by a purge air regulating unit having the features of claim 1 and having the method steps of the independent method claim.

The invention is based on the use of a peculiarity of membrane dryers with regulated or unregulated purge air, specifically that the reduction of the pressure dew point has a virtually uniform, constant value. When the pressure dew point changes at the inlet of a membrane dryer, the pressure dew point at the outlet changes accordingly. This is also desirable in many applications. However, in others it is important to achieve a certain pressure dew point at the outlet, independently of the pressure dew point at the inlet. This is often the case for example owing to normative specification in the medical field, for example when producing breathing air. It can be derived directly from the pressure dew point of the dried compressed air at the outlet whether the purge air conducted back into the housing is sufficient and whether the drying power of the membrane dryer is satisfactory.

The invention is thus based on the finding that optimal regulation of the purge air flow can be achieved by detecting the pressure dew point of the dried compressed air. Depending on the determined pressure dew point, the purge air flow can according to the invention be regulated to the required amount for a desired, selectable pressure dew point or pressure dew point range. In addition to an electronic regulation unit with a dew point sensor and a temperature sensor, a control valve is provided in the purge air channel.

The pressure dew point of the dried compressed air can be calculated using the determined values of the dew point sensor, which ultimately defines the humidity of the dried compressed air, and those of the temperature sensor. The determined values are forwarded to the electronic regulation unit in which the calculation is performed.

It is possible to use two separate sensors, that is, one dew point sensor and one temperature sensor, but a single sensor element that can determine both values is used by preference.

With commercially available membrane dryers, moist compressed air is conducted into the membrane dryer at an inlet and leaves said membrane dryer as dried compressed air or useful air via an outlet channel. Shortly before the outlet, a sub-flow of the dried compressed air is removed as purge air via a purge air channel and expanded. Said sub-flow is conducted along the outside of the membrane fibres, absorbs the water vapour and leaves the membrane dryer at the outlet. According to the invention, the purge air regulating unit is placed onto the membrane dryer and has two connections. One connection is connected to the outlet channel and the other connection is connected to the purge air channel of the membrane dryer and conducts the dried compressed air as purge air back to the membrane fibres. Before flowing back to the membrane fibres, the purge air flows through a purge air channel in the purge air regulating unit. The purge air regulating unit can also be connected to the purge air channel of the membrane dryer instead of to the outlet duct. The essential thing is only that dried compressed air is branched off and conducted into the purge air regulating unit before it returns to the membrane fibres.

When in the mounted state, the purge air regulating unit therefore includes a portion of the purge air channel.

In addition to the two connections, the purge air regulating unit has a control board with a processor, electrical connections for the energy supply, and for the usual transmission of data and signal to the operator. Preferably, but not necessarily, a display allows the actual state and the setting of desired states to be shown directly on the purge air regulating unit. Input can be made via the display itself (touchscreen) or via an additional keyboard. According to the invention, an externally arranged input unit and/or display can alternatively be used. Data transmission to the purge air regulating unit can take place in a wired or wireless manner.

According to the invention, the desired pressure dew point is stored as a target value in the regulating unit. It is also conceivable to store a value range within which the pressure dew point of the dried compressed air should fall. The regulating unit compares the determined or calculated pressure dew point of the dried compressed air with the target value or the target value range and then regulates the volume of the purge air flow depending on the result.

If the target value is exceeded, the control valve is actuated and purge air is conducted to the membrane fibres. According to the invention, this can take place in cycles, that is, with a defined number of opening and closing processes. If the target value is reached, no further cycles are carried out. If the target value is not reached even after a specified time, the control valve is opened continuously. The cycles can be defined variably, that is, with different opening and closing times. The specified time until continuous valve actuation is also variable. With this method, it is possible to use a control valve in the form of a simple magnetic valve with a valve plunger. This technology is very simple, inexpensive, works reliably and with little maintenance over long operating times.

Alternatively, the control valve can also be in the form of a motorised valve or proportional valve or other variants. The purge air channel can also be open or closed over some, that is, not all of its cross section. The actuator valve can open or close the purge air channel continuously, depending on the volume requirement at the purge air channel.

In a particularly advantageous variant, the control valve consists of a valve plunger and an actuator valve with an actuator valve plunger and a magnetic coil. The purge air channel branches off before the two valve plungers, a first portion ending at the valve plunger seat and a second portion ending at the actuator valve plunger seat. A connecting channel extends from the actuator valve plunger seat to the valve plunger space in which the valve plunger moves. The connecting channel opens into the valve plunger space on the side of the valve plunger that faces away from the valve plunger.

If the actuator valve plunger closes the actuator valve plunger seat and thus the second portion, the pressure of the dried compressed air flowing out of the housing is sufficient to move the valve plunger, as a result of which said plunger opens the valve plunger seat and thus the purge air channel, and the purge air can flow towards the membrane fibres.

In this variant, if the actuator valve is actuated by energising the magnetic coil, the actuator valve plunger moves and opens the actuator valve plunger seat. Since the pressure of the dried compressed air or useful air from the first portion is present at the actuator valve, said pressure than builds up in the space behind the valve plunger. This causes the latter to move, preferably assisted by a spring element, and to close the valve seat. Thus, no more purge air flows towards the membrane fibres.

In a particularly advantageous variant, a creep air channel is provided, through which a small amount of the dried compressed air passes through the valve plunger as creep air when said valve plunger closes the valve seat. The creep air channel connects the valve space to the purge air channel and opens into the purge air channel behind the control valve in the direction of flow.

The continuously flowing small amount of creep air ensures that flow can pass around the dew point sensor and the dew point can be detected even when the purge air flow is shut off. At the same time, the space around the membrane fibres always remains very dry, as a result of which rapid response behaviour is ensured.

The described preferred variant has the essential advantage that the control valve is open in the non-energised state and purge air can reach the membrane fibres. The membrane dryer can be operated even in the event of a power failure.

According to the invention, cyclic measurement is possible. To this end, the control valve is actuated occasionally even if there is no demand for purge air. The briefly flowing purge air flow is then used exclusively for pressure dew point measurement instead of the creep air. The creep air channel can then be omitted; the control valve may then need less air, depending on the cycles, since the continuous creep air flow can be omitted.

According to the invention, a variant with only one plunger can also be used. In this variant, the actuator valve plunger opens or closes the purge air channel directly. Such a structure allows costs to be saved.

The regulating unit has all modern interfaces of data communication or can be equipped therewith. Measurement values (pressure dew point, temperature) can also be forwarded, such as service states, for example the necessary replacement of wear parts, operating hours or similar. An alarm can also be emitted if the target value is not reached or is continuously not reached.

In addition to detection of the temperature and dew point mentioned above, additional data collection with sensors, e.g. for measuring pressure or volumetric flow, is also possible.

The purge air regulating unit according to the invention can be integrated in the housing head of the membrane dryer, resulting in a very compact and inexpensive structure. Alternatively, arrangement at another location in the housing is also possible.

Compared with the standard design, the invention produces considerable cost savings by shutting off when no useful air is needed and by adjusting to the varying useful air flow. In addition, the pressure dew point can be defined as a constant value. Depending on the application, this is very advantageous. A variable setting, adjusted to ambient conditions, is also possible.

The invention is explained in more detail on the basis of the figures below. Said figures should not be understood as limiting, but merely show schematic diagrams of the invention. In the figures:

DETAILED DESCRIPTION OF EMBODIMENTS

Figure 1:
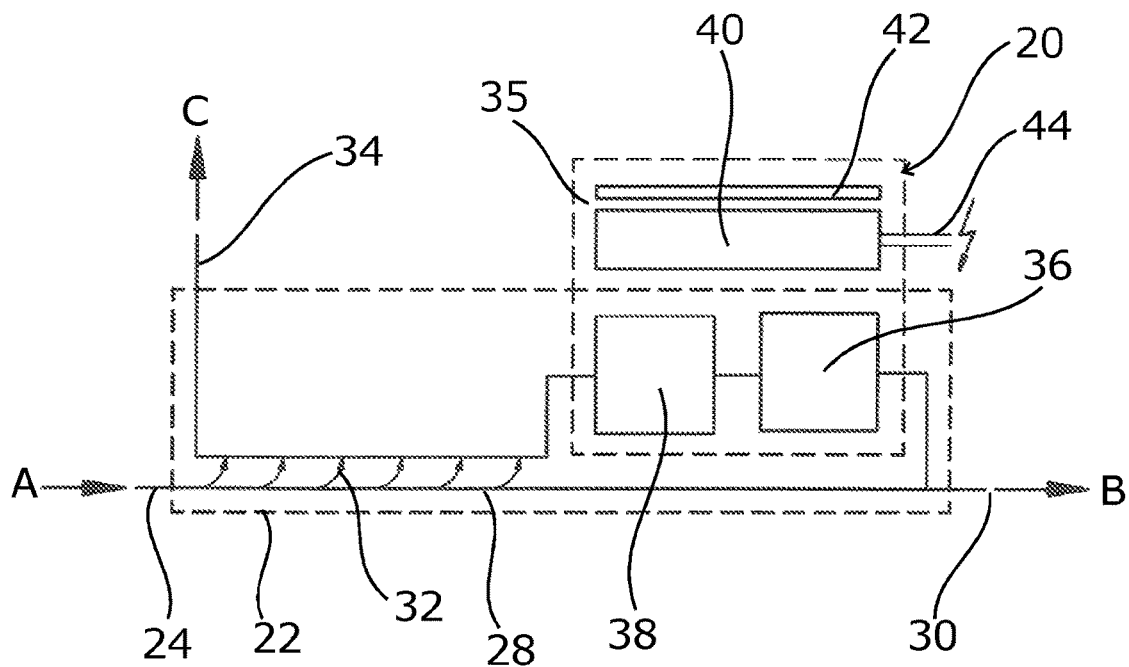
FIG. 1 shows the basic principle of the purge air regulating unit in a simplified schematic diagram.

FIG. 1 shows the function of a purge air regulating unit 20 according to the invention. Some of the fluid flows are indicated by arrows, moist air being marked A, dry compressed air being marked B, purge air being marked C and creep air being marked D.

The arrows illustrate the flow path of the compressed air inside the membrane dryer 22. The compressed air is conducted through an inlet 24 of a housing head 26 into the membrane dryer 22, passes through an inner tube into an exit space and flows from there through an annular housing space through membrane fibres 28 (hollow fibre membrane) back to the housing head and back out through an outlet 30 as dried compressed air B or useful air. When flow passes through the membrane fibres 28, the moisture in the compressed air diffuses outwards through the hollow fibre walls as water vapour 32.

A sub-flow of the dried compressed air B is diverted relatively shortly before the outlet 30, expanded and conducted as purge air C into the outer space of the hollow fibres, absorbs the diffused water vapour 32 there and then conducts it through a purge air output 34 into the environment.

According to the invention, the purge air regulating unit 20 is placed on the membrane dryer 22 and has two connections that are connected to the purge air channel, so that the purge air C flows through the purge air regulating unit 20 before flowing back to the membrane fibres 28.

The purge air regulating unit 20 has a dew point sensor 36 for detecting the dew point of the dried compressed air B, a temperature sensor (not shown) for detecting the temperature of the dried compressed air B and a control valve 38.

Further parts of the purge air regulating unit 20 are a control printed circuit board 40, a display 42, connections 44 for transferring data and signals, and a housing 46. The display 42 is optional and can in particular serve not only as a display means but also as an operation unit.

Figure 2:
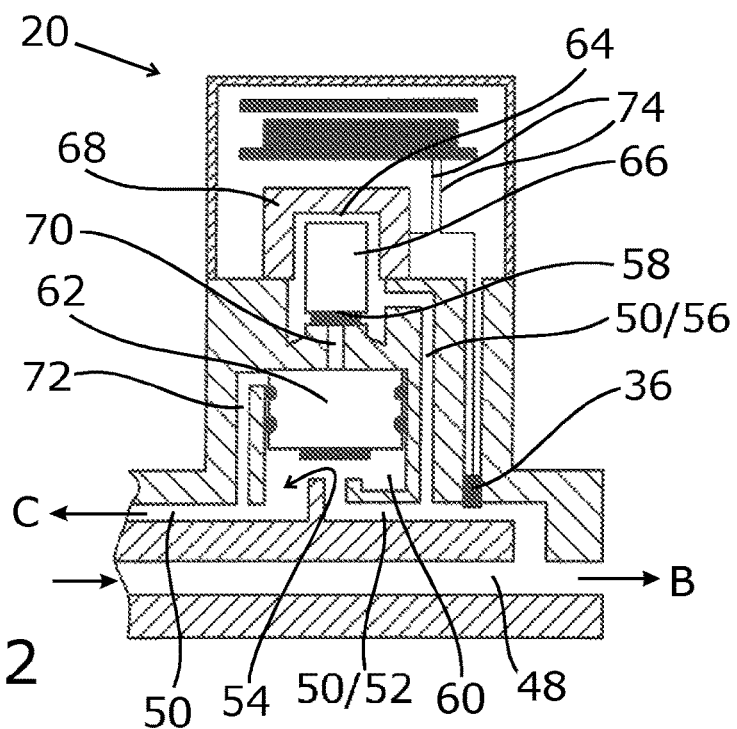
FIG. 2 shows a preferred variant of the invention in cross-section, with the purge air channel open.
Figure 3:
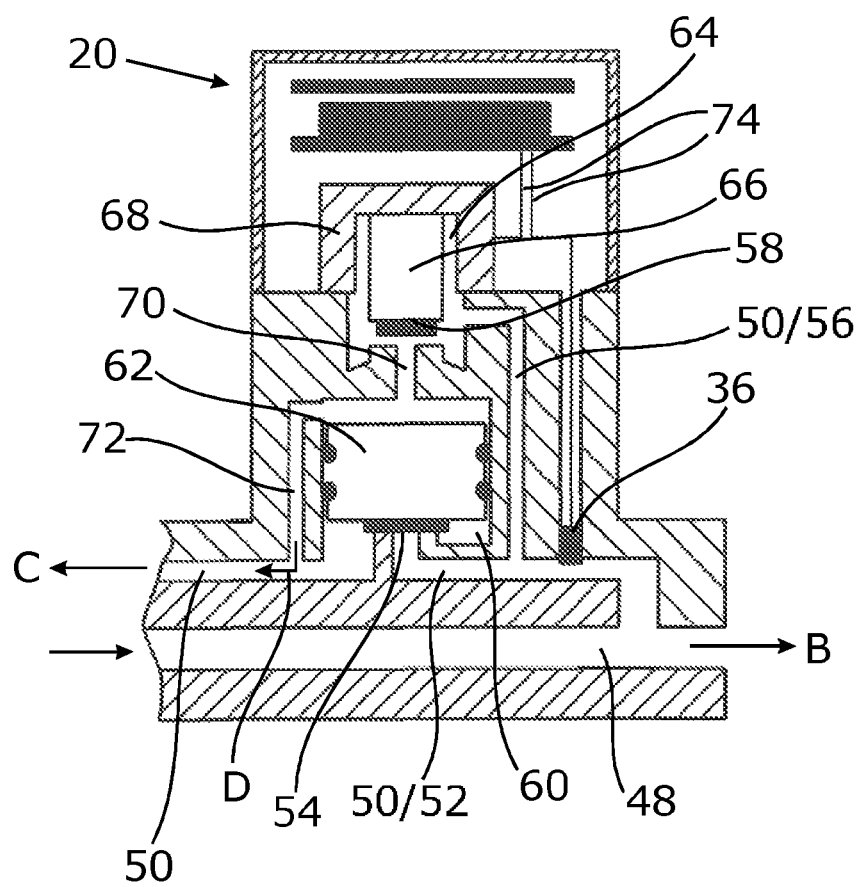
FIG. 3 shows the preferred variant of FIG. 2 with the purge air channel closed.

FIGS. 2 and 3 show a first variant according to the invention of the purge air regulating unit 20 in cross-section. FIG. 2 shows the situation when the control valve 38 is open, FIG. 3 shows the situation when the control valve 38 is closed.

It can be seen that the dew point sensor 36 is connected to the regulating unit 35 via electrical lines (data lines) 74 and the regulating unit 35 is in turn connected to the magnetic coil 68 via data lines 74. The electrical lines 74 primarily serve for signal transmission between the dew point sensor 36 and the control unit 35, and primarily for energy transmission between the magnetic coil 68 and the regulating unit 35.

An outlet channel 48, from which a purge air channel 50 branches off, can be seen. The purge air channel 50 branches into a first portion 52, which ends at a valve plunger seat 54, and a second portion 56, which ends at an actuator valve plunger seat 58. The valve plunger seat 54 bounds a valve plunger space 60, in which a valve plunger 62 is situated, and the actuator valve plunger seat 58 bounds an actuator valve plunger space 64, in which an actuator valve plunger 66 is situated. The actuator valve plunger 66 is surrounded by a magnetic coil 68 and can be moved by the latter.

The actuator valve plunger space 64 is connected to the valve plunger space 60 via a connecting channel 70. The connecting channel 70 opens into the valve plunger space 60 on the side opposite the valve plunger seat 54, so that the valve plunger 62 is arranged between the valve plunger seat 54 and the connecting channel 70 or the opening thereof.

Furthermore, a creep air channel 72 can be seen, which connects the valve plunger space 60 to the purge air channel 50 and opens into the latter behind the control valve 38 in the direction of flow.

FIG. 2 shows that the pressure of the dried compressed air B is present below the valve plunger 62, as a result of which the latter is lifted. Therefore, purge air C can flow through the valve plunger seat 54, along the purge air channel 50 to the membrane fibres 28. In the process, the actuator valve plunger 66 closes the actuator valve plunger seat 58, so that the second portion 56 is closed.

FIG. 3 shows the state in which the magnetic coil 68 has attracted the actuator valve plunger 66. The second portion 56 is opened thereby, since the actuator valve plunger 66 has opened the actuator valve plunger seat 58. Via the pressure of the dried compressed air B, sufficient pressure builds up in the valve plunger space 60 to press the valve plunger 62 onto the valve plunger seat 54, as a result of which the first portion 52 is closed and purge air C can no longer flow through the purge air channel 50.

It can also be seen that only creep air D can flow through the creep air channel 72 out of the valve plunger space 60 into the purge air channel 50.

The valve plunger 62 can be assisted in its movement by a spring (not shown).

In this variant, the purge air channel 50 is therefore open when the magnetic coil 68 is in the non-energised state, so that purge air C can flow in particular even in the event of a power failure or malfunction.

In the exemplary embodiment shown, the dew point sensor 36 is in the purge air channel 50. Alternatively, it can also be arranged in the outlet channel 48.

Capacitive sensors or else mirror-type dew point sensors, for example, can be used as the dew point sensor 36.

The invention is not limited to the exemplary embodiments shown but also includes further variants that can be implemented on the basis of the explained invention.

What is claimed is:

1. A purge air regulating unit for a drying device for compressed air, comprising:
    a regulator configured to calculate a pressure dew point of dried compressed air, comprising a dew point sensor configured to detect a dew point of the dried compressed air and a temperature sensor configured to detect a temperature of the dried compressed air; and
    a control valve which is regulated by the regulator and at least partially opens or closes a purge air channel based on the pressure dew point of the dried compressed air;
    wherein the purge air regulating unit is connectable to a housing including a membrane filter therein, such that a sub-flow of dried compressed air flowing out of the housing from an outlet channel thereof is conductible back to the membrane filter as purge air by the purge air regulating unit.

2. The purge air regulating unit according to claim 1, wherein the dew point sensor is located in the purge air channel.

3. The purge air regulating unit according to claim 1, wherein the dew point sensor is located in the outlet channel of the housing.

4. The purge air regulating unit according to claim 1, further including a creep air channel configured so that dried compressed air flows continuously back into the housing as creep air, even when the control valve is closed.

5. The purge air regulating unit according to claim 4, wherein the creep air channel branches off behind the dew point sensor in a direction of flow.

6. The purge air regulating unit according to claim 1, wherein the control valve is a motorized valve.

7. The purge air regulating unit according to claim 1, wherein the control valve includes a solenoid valve.

8. The purge air regulating unit according to claim 1, wherein the control valve includes a valve plunger configured to close and open the purge air channel, and an actuator valve plunger, configured to close and open an actuator channel.

9. The purge air regulating unit according to claim 8, wherein the valve plunger opens the purge air channel when the actuator valve plunger closes the actuator channel.

10. The purge air regulating unit according to claim 8, wherein the valve plunger is configured such that the purge air presses the valve plunger into an open position when the actuator valve plunger closes the actuator channel.

11. The purge air regulating unit according to claims 8, further including an energizing magnetic coil configured to move the actuator valve plunger.

12. A method for regulating the flow of dried compressed air flowing out of a membrane dryer back into a housing of the membrane dryer having a membrane filter therein, comprising:
    ascertaining a pressure dew point of dried compressed air flowing out of the membrane dryer; and
    regulating said flow by, based on the ascertained pressure dew point, opening or closing a control valve located in a purge air channel configured to conduct dried compressed air back to the membrane dryer as purge air when the control valve is open.

13. The method according to claim 12, further comprising comparing the ascertained pressure dew point with a target value and, when there is a deviation from the target value, cyclically opening and closing the control valve until the target value is reached.

14. The method according to claim 13, further comprising continuously opening the control valve when the target value is not reached by said cyclic opening and closing of the control valve after a predefined time period.

15. The purge air regulating unit according to claim 1, wherein the membrane filter comprises a bundle of hollow fiber membranes.

16. The method according to claim 12, wherein the membrane filter comprises a bundle of hollow fiber membranes.

* * * * *